US008689172B2

(12) United States Patent
Amaral et al.

(10) Patent No.: US 8,689,172 B2
(45) Date of Patent: Apr. 1, 2014

(54) MINING SEQUENTIAL PATTERNS IN WEIGHTED DIRECTED GRAPHS

(75) Inventors: Jose Nelson Amaral, Edmonton (CA); Adam Paul Jocksch, Edmonton (CA); Marcel Mitran, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1145 days.

(21) Appl. No.: 12/410,460

(22) Filed: Mar. 24, 2009

(65) Prior Publication Data

US 2010/0251210 A1    Sep. 30, 2010

(51) Int. Cl.
G06F 9/44 (2006.01)
G06F 9/45 (2006.01)

(52) U.S. Cl.
USPC ............................ 717/104; 717/105; 717/141

(58) Field of Classification Search
None
See application file for complete search history.

(56) References Cited

U.S. PATENT DOCUMENTS

| | | | |
|---|---|---|---|
| 5,742,811 A | 4/1998 | Agrawal et al. | |
| 6,571,199 B1 * | 5/2003 | Floratos et al. | 702/179 |
| 6,826,569 B2 | 11/2004 | Robertson | |
| 7,143,091 B2 * | 11/2006 | Charnock et al. | 1/1 |
| 7,379,937 B2 * | 5/2008 | Inokuchi | 1/1 |
| 7,584,181 B2 * | 9/2009 | Zeng et al. | 1/1 |
| 7,870,141 B2 * | 1/2011 | Judge et al. | 707/750 |
| 7,873,657 B2 * | 1/2011 | Roche et al. | 717/141 |
| 7,925,599 B2 * | 4/2011 | Koren et al. | 706/12 |
| 8,056,048 B2 * | 11/2011 | Stevenson et al. | 717/105 |
| 8,196,089 B2 * | 6/2012 | Bouchard et al. | 717/104 |
| 8,286,149 B2 * | 10/2012 | Dor et al. | 717/141 |
| 8,312,417 B2 * | 11/2012 | Kohli | 717/104 |
| 8,555,243 B2 * | 10/2013 | Correll | 717/105 |
| 2002/0087275 A1 * | 7/2002 | Kim et al. | 702/19 |
| 2005/0044538 A1 * | 2/2005 | Mantripragada | 717/151 |
| 2006/0048093 A1 * | 3/2006 | Jain et al. | 717/104 |
| 2006/0101435 A1 * | 5/2006 | Akilov et al. | 717/141 |
| 2006/0117306 A1 * | 6/2006 | Kimura et al. | 717/141 |
| 2007/0074182 A1 * | 3/2007 | Hinchey et al. | 717/104 |
| 2008/0127043 A1 * | 5/2008 | Zhou et al. | 717/104 |

(Continued)

OTHER PUBLICATIONS

Yun, "A new framework of detecting weighted sequential patterns in large sequence databases", Apr. 2007; Elsevier; [retrieved on May 8, 2012]; Retrieved from Internet <URL:http://www.sciencedirect.com/science/article/pii/S095070510700041X>;pp. 110-122.*

(Continued)

Primary Examiner — Thuy Dao
Assistant Examiner — Xi D Chen
(74) Attorney, Agent, or Firm — Nelson and Nelson; Daniel P. Nelson; Alexis V. Nelson

(57) ABSTRACT

A method for finding sequential patterns of attributes in a directed graph includes constructing a directed graph comprising multiple nodes and edges between the nodes. Each of the nodes may be assigned one or more attributes. Similarly, each of the edges may be assigned a weight value which may indicate the probably the edge will be traversed during traversal of the directed graph. The method may further include finding sequences of attributes in the directed graph that have some minimum amount of frequency and/or time support. In performing this step, the frequency support of each individual instance of a sequence of attributes may be calculated by multiplying the weight values along the edge or edges of the instance. A corresponding apparatus and computer program product are also disclosed and claimed herein.

12 Claims, 12 Drawing Sheets

(56) References Cited

U.S. PATENT DOCUMENTS

| | | | |
|---|---|---|---|
| 2008/0148245 A1* | 6/2008 | Gutz | 717/141 |
| 2012/0030646 A1* | 2/2012 | Ravindran et al. | 717/105 |
| 2012/0030647 A1* | 2/2012 | Wang et al. | 717/105 |
| 2012/0030648 A1* | 2/2012 | Correll | 717/105 |

OTHER PUBLICATIONS

Jain, Obermayer, "Structure Spaces", 2009, Journal of Machine Learning Research; [retrieved on Oct. 31, 2013]; Retrieved from Internet <URL:http://dl.acm.org/citation.cfm?id=1577069>; pp. 2667-2714.*

Li, et al., "A Directed Labeled Graph Frequenct Pattern Mining Algorithm based on Minimum Code"; 2007, 3$^{rd}$ International Conference on Multimedia and Ubiquitous Engineering; [retrieved on Oct. 31, 2013]; Retrieved from Internet <UrL:http://ieeexplore.ieee.org/stamp/stamp.jsp?tp=&arnumber=5318916>;pp. 353-359.*

Papapetrou, "Finding representative objects using link analysis ranking"; 2012 ACM;[retrieved on Oct. 31, 2013]; Retrieved from Internet <URL:http://dl.acm.org/citation.cfm?id=2413097>; pp. 1-4.*

Shen, "Unsupervised Online Learning Trajectory Analysis Based on Weighted Directed Graph", 2012 ICPR;[retrieved on Oct. 31, 2013]; Retrieved from Internet <UrL:http://ieeexplore.ieee.org/stamp/stamp.jsp?tp=&arnumber=6460379>;pp. 1306-1309.*

Runian Geng, Xiangjun Dong, Xingye Zhang, and Wenbo Xu, "Efficiently Mining Closed Frequent Patterns with Weight Constraint from Directed Graph Traversals Using Weighted FP-Tree Approach," Proceedings of the 2008 ISECS International Colloquium on Computing, Communication, Control, and Management, Aug. 2008, vol. 3, pp. 399-403.

Seong Dae Lee and Hyu Chan Park, "Mining Frequent Patterns from Weighted Traversals on Graph using Confidence Interval and Pattern Priority", IJCSNS International Journal of Computer Science and Network Security, vol. 6 No. 5A, May 2006, pp. 136-141.

Chung-Chien Hwang, Shih-Kun Huang, Deng-Jyi Chen, and David T. K. Chen, "Object-Oriented Program Behavior Analysis Based on Control Patterns," Proceedings of the Second Asia-Pacific Conference on Quality Software, IEEE Computer Society, 2001, pp. 81-87.

* cited by examiner

300

```
int Mdata [50];
int Fdata [50];

// Main method
int main(int argc, char** argv) {
  int num = atoi(argv [1]);
  if (num > 50)
    exit (0);
  int i;

for (i = 0; i < num; i++) {
    Mdata[ i ] = M( i );
    Fdata[ i ] = F( i );
  } return 0;
}

// Male function
int M(int n) {
  int val;
  if (n == 0)
    val = 0;
  else
    val = n - F(M(n - 1));

return val;
}

// Female Function
int F(int n) {
  int val;
  if (n == 0)
    val = 1;
  else
    val = n - M(F(n – 1));

return val;
}
```

Fig. 3

```
main:                        M:                           F:
1     mv    num, argv + 4    1     pop    n               1     pop    n
2     leq   num, 50          2     eq     n, 0            2     eq     n, 0
3     cond  cont_main        3     cond   base_M          3     cond   base_F
4     jump  end_main         4     sub    tmp, n, 1       4     sub    tmp, n, 1
cont_main:                   5     push   tmp             5     push   tmp
5     mvi   i, 0             6     call   M               6     call   F
loop_main:                   7     call   F               7     call   M
6     geq   i, num           8     pop    tmp             8     pop    tmp
7     cond  end_main         9     sub    tmp, n, tmp     9     sub    tmp, n, tmp
8     push  i                10    push   tmp             10    push   tmp
9     call  M                11    jump   end_M           11    jump   end_F
10    pop   Mdata + 4*i      base_M:                      base_F:
11    push  i                12    push   0               12    push   1
12    call  F                end_M:                       end_F:
13    pop   Fdata + 4*i      13    ret                    13    ret
14    incr  i
15    jump  loop_main
end_main:
16    exit  0
```

Fig. 4

MINING SEQUENTIAL PATTERNS IN WEIGHTED DIRECTED GRAPHS

FIELD OF THE INVENTION

This invention relates to data mining, and more particularly to apparatus and processes for mining sequential patterns in directed graphs such as computer-program control flow graphs.

BACKGROUND OF THE INVENTION

Identifying performance bottlenecks is one of the most important (and difficult) tasks a software developer faces when trying to improve the efficiency of program code. This is because a large amount of time is typically spent executing a relatively small number of execution patterns (instructions, sequences of instructions, etc.) within the code. This is true for even large software systems such as web applications. Consequently, it is important for software developers to be able to identify execution patterns that may be performance bottlenecks so that these executions patterns can be optimized. Unfortunately, finding these execution patterns can be challenging.

At a very low level, performance bottlenecks in a program can take a number of forms. For example, a performance bottleneck may occur as a result of a contextual situation which could potentially be solved by optimizing the compiler. A bottleneck may also be the result of poor code generation by the compiler. In either case, an engineer may identify these bottlenecks by examining performance data in the form of hardware profiles. The information in hardware profiles varies from architecture to architecture, but usually includes such information as instruction and data cache misses, and other low-level information. A hardware profile by nature is aggregated, which is to say that if one section of code is visited multiple times, the data from each visit will be grouped together.

More often, low level performance issues are identified through manual observation. For example, a compiler engineer may manually examine a hardware profile in an attempt to identify patterns which are indicative of a performance bottleneck. The engineer may then devise a solution to increase the efficiency of the bottleneck. This process is typically slow and heavily reliant on the intuition of the compiler engineer.

In view of the foregoing, what are needed are apparatus and methods to more easily identify execution patterns that are potential performance bottlenecks in program code. Ideally, such apparatus and methods could leverage and improve upon existing data mining techniques for finding sequential patterns. Such apparatus and methods will ideally allow software developers to direct resources to optimizing the executions patterns that represent performance bottlenecks. Yet further needed are apparatus and methods to find sequential patterns in any method or process that can be represented as a directed graph having branches, join points, and/or cycles.

SUMMARY

The invention has been developed in response to the present state of the art and, in particular, in response to the problems and needs in the art that have not yet been fully solved by currently available apparatus and methods. Accordingly, the invention has been developed to provide improved apparatus and methods for finding sequential patterns in directed graphs. The features and advantages of the invention will become more fully apparent from the following description and appended claims, or may be learned by practice of the invention as set forth hereinafter.

Consistent with the foregoing, a method for finding sequential patterns of attributes in a directed graph is disclosed herein. In selected embodiments, such a method may include constructing a directed graph comprising multiple nodes and edges between the nodes. Each of the nodes may be assigned one or more attributes. Similarly, each of the edges may be assigned a weight value which may indicate the probability that the edge will be traversed during traversal of the directed graph. The method may further include finding sequences of attributes in the directed graph that have some minimum amount of frequency and/or time support. In performing this step, the frequency support of each individual instance of a sequence of attributes may be calculated by multiplying the weight values along the edge or edges of the instance.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 3 is a computer program that calculates the first N Hofstader male/female numbers;

FIG. 4 is a listing of pseudo-assembly code for the computer program of FIG. 3;

DETAILED DESCRIPTION

Figure 1A:
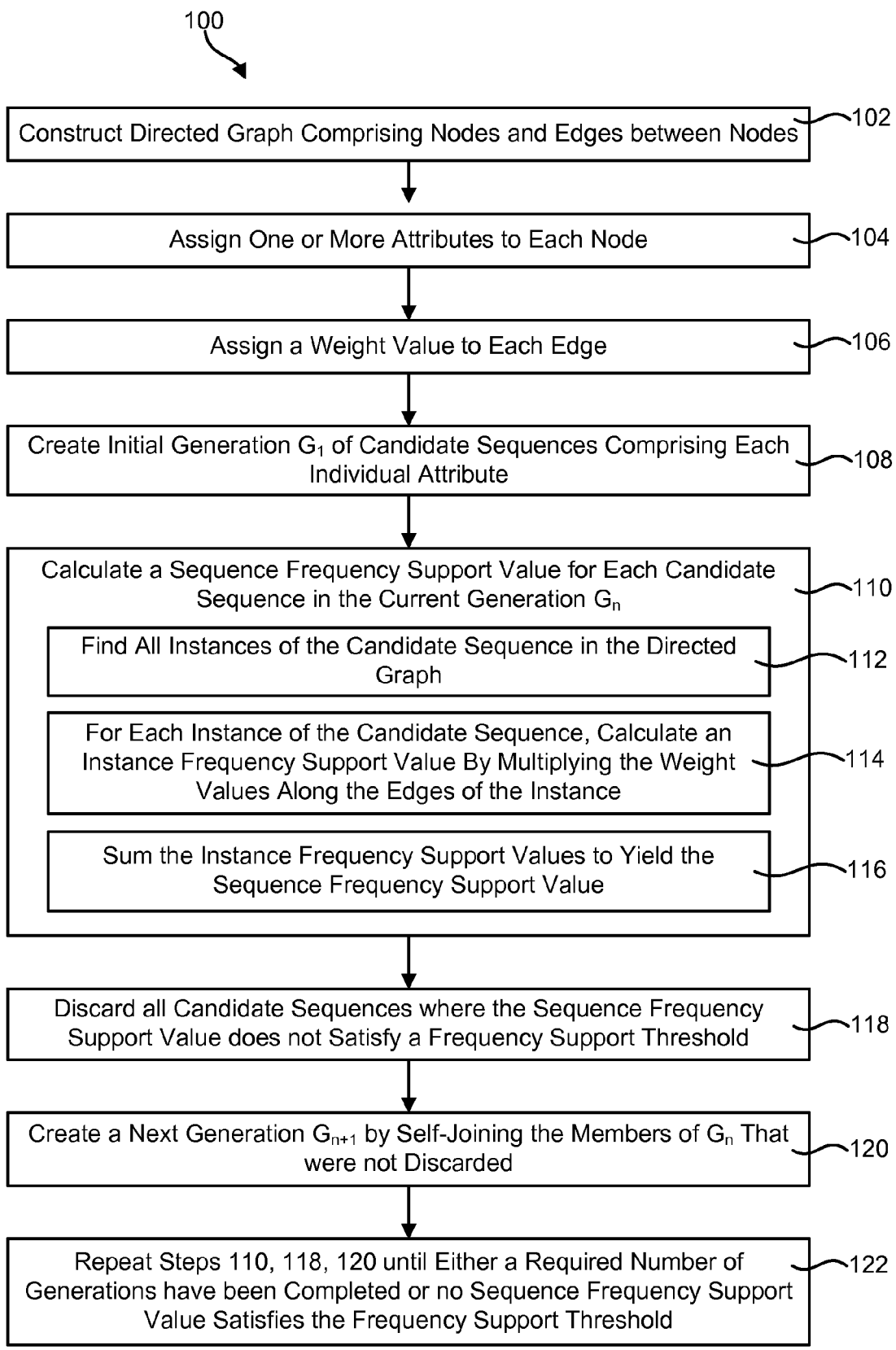
FIG. 1A is a flow chart showing one embodiment of a method for finding sequential patterns of attributes having some specified "frequency support"

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer program product embodied in any tangible medium of expression having computer-usable program code stored in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1B:
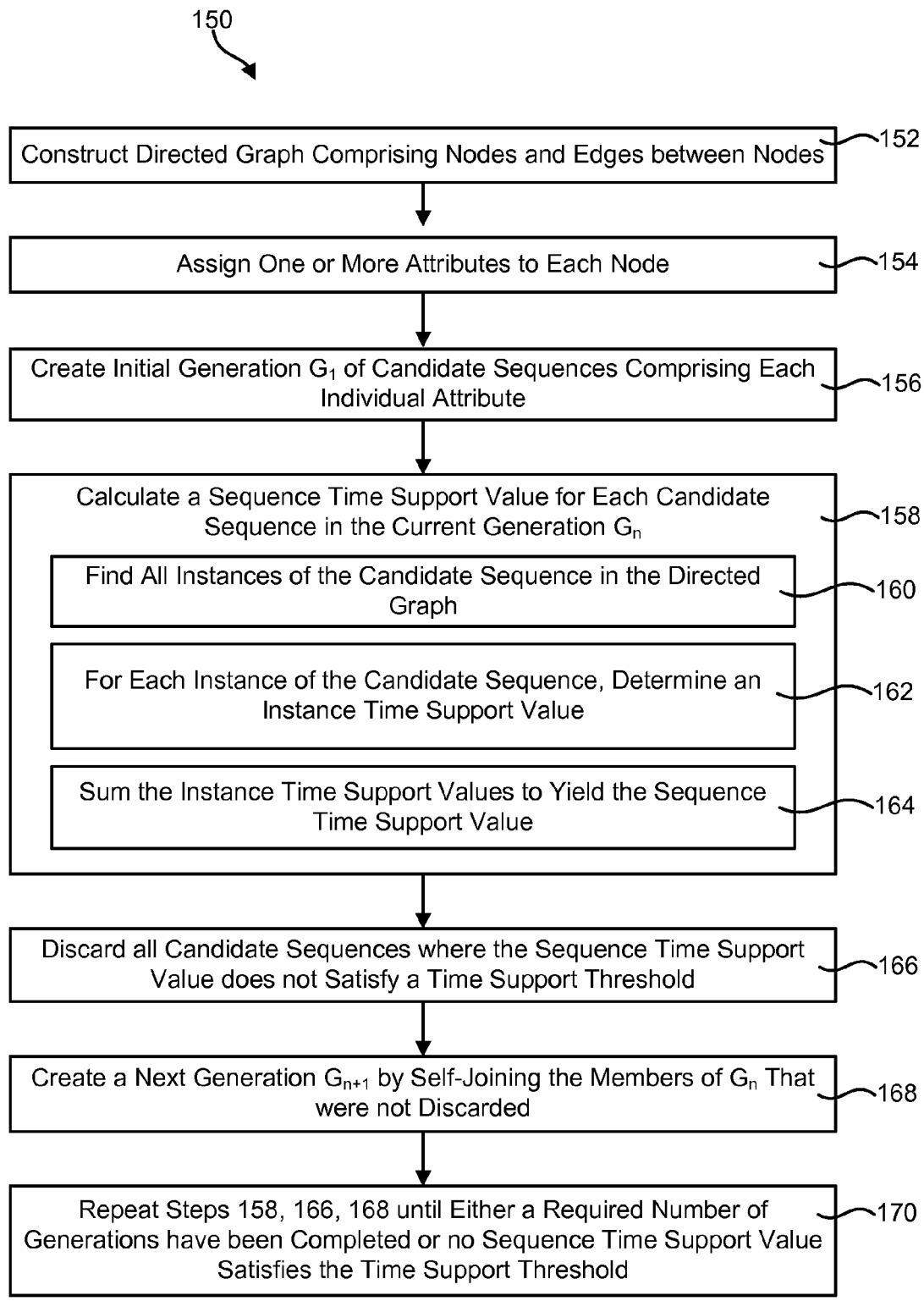
FIG. 1B is a flow chart showing one embodiment of a method for finding sequential patterns of attributes having some specified "time support"

Referring to FIGS. 1A and 1B, as previously mentioned, apparatus and methods are needed to enable software developers to more easily identify execution patterns that are potential performance bottlenecks in program code. To accomplish this, techniques are needed to identify execution patterns that occur frequently as well as those that consume a significant amount of time when executing. To achieve this goal, embodiments of the invention use data mining techniques, and more particularly data mining techniques for finding sequential patterns of attributes in directed graphs. In doing so, the embodiments build upon data mining techniques disclosed in U.S. Pat. No. 5,742,811 to Agrawal et al. (hereinafter "the Agrawal patent"), and entitled "Method and System for Mining Generalized Sequential Patterns in a Large Database," which is incorporated by reference in its entirety. In particular, embodiments of the invention provide functionality for mining sequential patterns of attributes in directed graphs having branches, join points, and cycles, each of which is very common in the control flow graphs of program code. The inventors of the present invention have found that the data mining techniques disclosed in the Agrawal patent are inadequate for finding sequential patterns of attributes in directed graphs having these characteristics.

In the following disclosure, various examples are presented that are primarily directed to finding sequential patterns of attributes in the control flow graphs of program code. Nevertheless, the disclosed apparatus and methods are not limited to program code, but may be used to find sequential patterns in any method or process that can be represented as a directed graph having branches, join points, and/or cycles. Thus, the examples presented herein, particularly when referring to program code, are to be considered in all respects as illustrative and not restrictive. The scope of the invention is, therefore, indicated by the appended claims rather than by the following description.

As mentioned, apparatus and methods are needed to identify execution patterns that occur frequently as well as those that consume a significant amount of time when executing. FIG. 1A is directed to a method for identifying sequential patterns that occur frequently (i.e., have some specified amount of "frequency support"), while FIG. 1B is directed to a method for identifying sequential patterns that consume a significant amount of time (i.e., have some specified amount of "time support"). It should be noted that the methods 100, 150 illustrated in FIGS. 1A and 1B have many steps in common and thus can be performed at the same time for a given directed graph. Similarly, in selected embodiments, the methods 100, 150 may be combined to produce a single method that can perform both tasks simultaneously.

Figure 2:
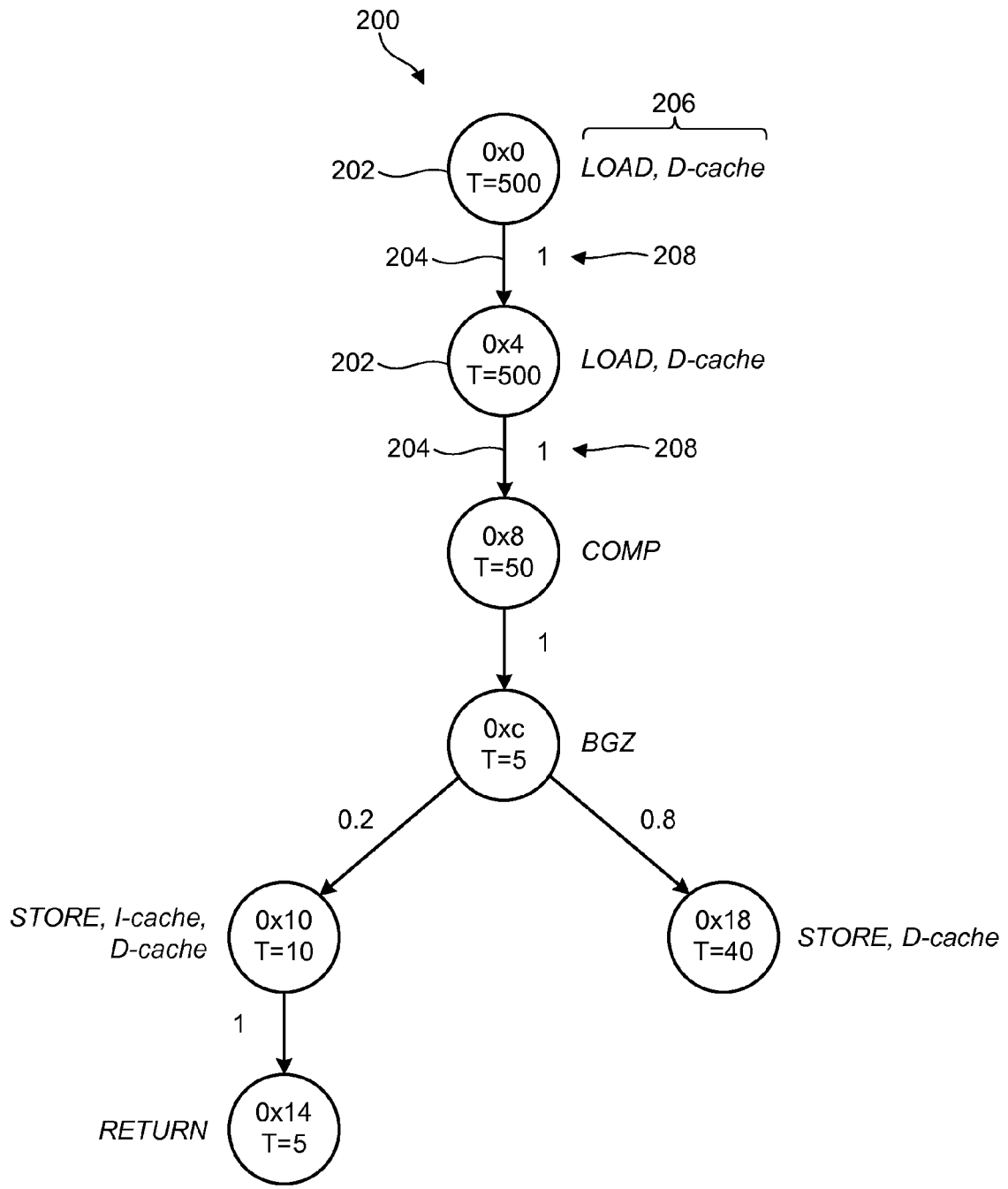
FIG. 2 is an example of a directed graph (i.e., a control flow graph) representing the execution flow of a portion of a computer program.

Referring to FIG. 1A, while also referring generally to FIG. 2, in selected embodiments, a method 100 for finding sequential patterns of attributes in a directed graph 200 with some minimum "frequency support" may include initially constructing 102 a directed graph 200 comprising multiple nodes 202 and edges 204 between the nodes 204. An edge 204 will exist between nodes A and B where the flow can transition directly from node A to node B. Where the method 100 is directed to finding sequential patterns in program code, each node 202 may represent an opcode, bytecode, instruction, method, function, basic block (i.e., a block of instructions), or other unit of program code.

Each node 202 may be assigned 104 one or more attributes 206. For example, where the nodes 202 represent program instructions, these attributes 206 may include an identifier (such as the name of the instruction), and attributes such as "D-cache," "I-cache," "Branchmiss," or the like, which may indicate whether the instruction has suffered an instruction cache miss, a data cache miss, a branch misprediction, or the like. These represent just a few examples of attributes 206 and are not intended to be an exhaustive list. Different attributes 206 will be explained in more detail in association with FIG. 2.

The method 100 may also assign 106 a weight value 208 to each of the edges 204. In certain embodiments, the weight value 208 may represent the probability the edge 204 will be traversed when traversing the directed graph 200 (such as when executing a program). In certain embodiments, the weight value 208 for an edge AB (an edge from node A to node B) may be calculated using the following equation:

$$\frac{freq(AB)}{\sum_{e \in outedges(A)} freq(e)}$$

This equation divides the frequency of traversing edge AB by the frequency of traversing all the outedges of node A. This value will fall in the range [0, 1]. Where the directed graph 200 represents the execution flow of a computer program, the edge weights 208 may be obtained from edge frequencies extracted from control flow graph information in compilation logs. In certain embodiments, only intra-method braches are assigned edge weights 208. In such embodiments, each method (or function or procedure) in the computer program may be a weakly connected component in the directed graph 200.

At this point, the method 100 may make multiple passes over the directed graph 200 to find sequences that have some minimum "frequency support." This may be accomplished by creating 108 an initial generation $G_1$ of candidate sequences that includes each individual attribute 206 (i.e., candidate sequences that comprise a single attribute 206). The method 100 may then calculate 110 a sequence frequency support value for each candidate sequence in the current generation (at this point the $G_1$ generation). This step 110 may include finding 112 all instances of the candidate sequence in the directed graph 200. For each instance discovered, an instance frequency support value may be calculated 114 by multiplying the weight values 208 along the edges of the instance. These instance frequency support values may then be summed 116 to yield the sequence frequency support value. By using the weight value(s) 208 to calculate the instance frequency support values, candidate sequences that are encountered more frequently when traversing the directed graph 200 will receive more weight than those that are encountered less frequently.

The sequence frequency support value may then be compared to a frequency support threshold value. Upon making this comparison, all candidate sequences whose sequence frequency support value does not satisfy the frequency threshold value (such as being equal to or greater than or equal to the frequency threshold value) may be discarded 118. This will eliminate candidate sequences which are not traversed frequently enough in the directed graph 200 to warrant concern or further analysis. The remaining candidate sequences may be kept and a next generation $G_{n+1}$ of candidate sequences may be created 120 from those not discarded in step 118.

The method steps 110, 118, 120 may then be repeated 122. For example, a next generation $G_2$ may be created and the method 100 may calculate frequency support values for candidate patterns comprising two attributes. This process may continue until a selected number of generations has been completed or until there is no candidate sequence with a frequency support value that satisfies the frequency support threshold. In this way, the method 100 finds all candidate sequences in the directed graph 200 that are traversed with some specified frequency. Where the directed graph 200 represents program code, this provides valuable information to a software developer to allow him/her to dedicate resources to optimizing these particular sequences in the program code, since these will likely yield the greatest performance improvements.

Referring to FIG. 1B, while continuing to refer generally to FIG. 2, in selected embodiments, a method 150 for finding sequential patterns with some minimum "time support" may include many of the same steps disclosed in FIG. 1A. For example, the method 150 may construct 152 a directed graph 200 and assign 154 one or more attributes 206 to each of the nodes 202 in the graph 200. The method 150 may then make multiple passes over the directed graph 200 to find sequences that have some minimum "time support." This may be accomplished by creating 156 an initial generation $G_1$ of candidate sequences as previously described. The method 150 may then calculate 158 a sequence time support value for each candidate sequence in the current generation $G_n$. This step 158 may include finding 160 all instances of the candidate sequence in the directed graph 200. For each instance discovered, an instance time support value may be determined 162. For example, where the nodes 202 of the directed graph 200 represent instructions in a computer program, this step 162 may include determining the number of "ticks" that were recorded for each instruction in the sequence. The number of ticks may, in certain embodiments, be measured by a hardware counter which may provide a good indicator of the amount of time each instruction in the sequence requires for execution.

Once an instance time support value is determined 162 for each candidate sequence in the directed graph 200, these instance time support values may be summed 164 to calculate the sequence time support value. The sequence time support value may then be compared to a time support threshold value. Upon making this comparison, all candidate sequences whose sequence time support value does not satisfy the time threshold may be discarded 166. This will eliminate candidate sequences that do not execute for enough time to warrant further analysis. The remaining candidate sequences may be kept and a next generation $G_{n+1}$ of candidate sequences may be created 168 from those that were not discarded in step 166. The method steps 158, 166, 168 may then be repeated 170 until a selected number of generations has been completed or until there is no candidate sequence with a time support value that satisfies the time support threshold. In this way, the method 150 will find all candidate sequences that take some specified time to execute. This will allow software developer to dedicate resources to optimizing instructions or sequences of instructions requiring more time to execute, since this will also likely yield better performance improvements.

Referring to FIG. 2, in order to illustrate the methods 100, 150 described in FIGS. 1A and 1B, consider the following program profile sample with performance data, as shown in Table 1:

TABLE 1

Example of Program Profile Data

| Offset | Instruction | Ticks | I-cache Misses | D-cache Misses |
|---|---|---|---|---|
| 0x0 | LOAD<addr1>, r1 | 500 | 0 | 50 |
| 0x4 | LOAD<addr2>, r2 | 500 | 0 | 50 |
| 0x8 | COMP r0, r1, r2 | 50 | 0 | 0 |
| 0xc | BGZ PC+0xc | 5 | 0 | 0 |
| 0x10 | STORE<addr4>, r1 | 10 | 10 | 50 |
| 0x14 | RETURN | 5 | 0 | 0 |
| 0x18 | STORE<addr5>, r2 | 40 | 0 | 5 |

The instructions shown in Table 1 may be used to generate the directed graph 200 (i.e., the control flow graph 200) of FIG. 2. In this example, the attributes "I-cache" and "D-cache" are binary values with a value of either TRUE or FALSE. In this example, an I-cache or D-cache attribute is assigned to a node 202 if the corresponding instruction has suffered at least one I-cache or D-cache miss. Also, for the purposes of this example, a sequence is denoted as <item1 item2 . . . itemN> and an item is denoted as (attribute1 attribute2 . . . attribute N). Thus, a sequence may be denoted as <(a b) (d) (a d)>.

As shown in the directed graph 200, the sequence <(LOAD D-cache)> would have a support value of 2.0, as it has two instances in the graph 200, each with a support value of 1.0. The sequence <(LOAD D-cache)> has a tick value of 500+500=1000. Similarly, the sequence <(COMP) (BGZ) (I-cache)> has a support value of 0.2 as the only instance in the graph has a support value of 1×0.2=0.2. The sequence <(COMP) (BGZ) (I-cache)> has a tick value of 50+5+10=65.

Referring to FIGS. 3 through 10, a more complex example is provided to illustrate the methods 100, 150 described in FIGS. 1A and 1B. Some minor differences may exist between the methods described in association with FIGS. 3 through 10 and the methods 100, 150 described in FIGS. 1A and 1B, although each of the basic steps shown in FIGS. 1A and 1B may be present in one form or another. In the following example, assume the following notation applies:

Let a control flow graph G=⟨I, E, A, F, T⟩ represent the execution flow of a program such that:

I is a finite set of nodes $i_0, i_1, \ldots, i_n$ in the control flow graph. A node may represent a single instruction, a basic block, a bytecode, an opcode, a method or procedure, or other unit of program code. Typically, all nodes are of the same type in a given instance of a control flow graph.

E is a set of edges in the control flow graph such that an edge $(i_a, i_b) \in E$ indicates that it is possible for node $i_b$ to be executed after node $i_a$ in at least one execution of the program.

A is a set of attributes associated with each node in the control flow graph. Examples of attributes may include instruction cache miss, pipeline stall, data cache miss, TLB miss, branch misprediction, or the like. Some attributes are binary and may be represented by a TRUE or FALSE value. Attributes that are measured by an integer count, such as instruction cache miss, may be converted to a binary representation by comparison with a set threshold. The notation $i_a$.<attribute> is used to refer to an attribute of instruction $i_a$. For instance, if the instruction $i_a$ suffers an instruction cache miss more frequently than a specified cache miss threshold, then $i_a$.ICmiss=TRUE.

F is a set of normalized frequencies associated with the edges of the control flow graph. The frequency $f(i_a, i_b) \in F$ associated with the edge $(i_a, i_b)$ indicates the fraction of the total edge frequencies occupied by $i_b$).

T is a set of normalized execution times associated with the nodes in the graph. The normalized execution time associated with instruction $i_a$, $t(i_a)$ represents the fraction of the total execution time that was spent in execution unit $i_a$.

Referring to FIG. 3, a program 300 may be used to illustrate the methods 100, 150 described in FIGS. 1A and 1B. The program 300 calculates the first NHofstadter male/female numbers. These numbers are calculated using the following mutually recursive formula:

$$M(0)=0$$

$$M(n)=n-F(M(n-1))$$

$$F(0)=1$$

$$F(n)=n-M(F(n-1))$$

FIG. 4 lists pseudo-assembly code for the three methods of the program 300. The instructions are numbered for future reference in the Figures to follow. In the illustrated example, the target machine is a register-based machine with special instructions "push" and "pop" to handle manipulation of the stack pointer for method calls.

Figure 5:
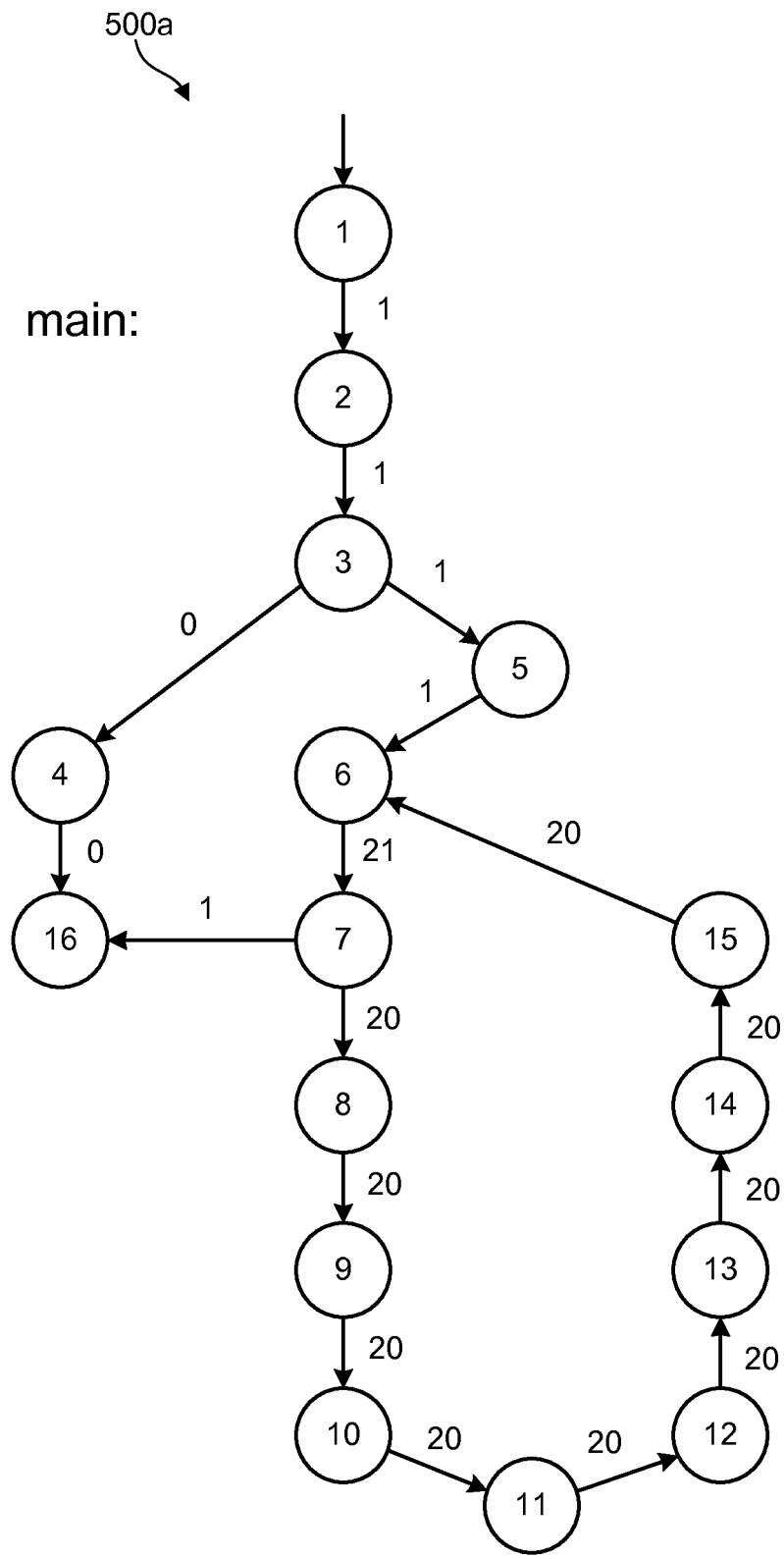
FIGS. 5, 6, and 7 are control flow graphs for the three methods (main, M, and F) for the pseudo-assembly code shown in FIG. 4.
Figure 6:
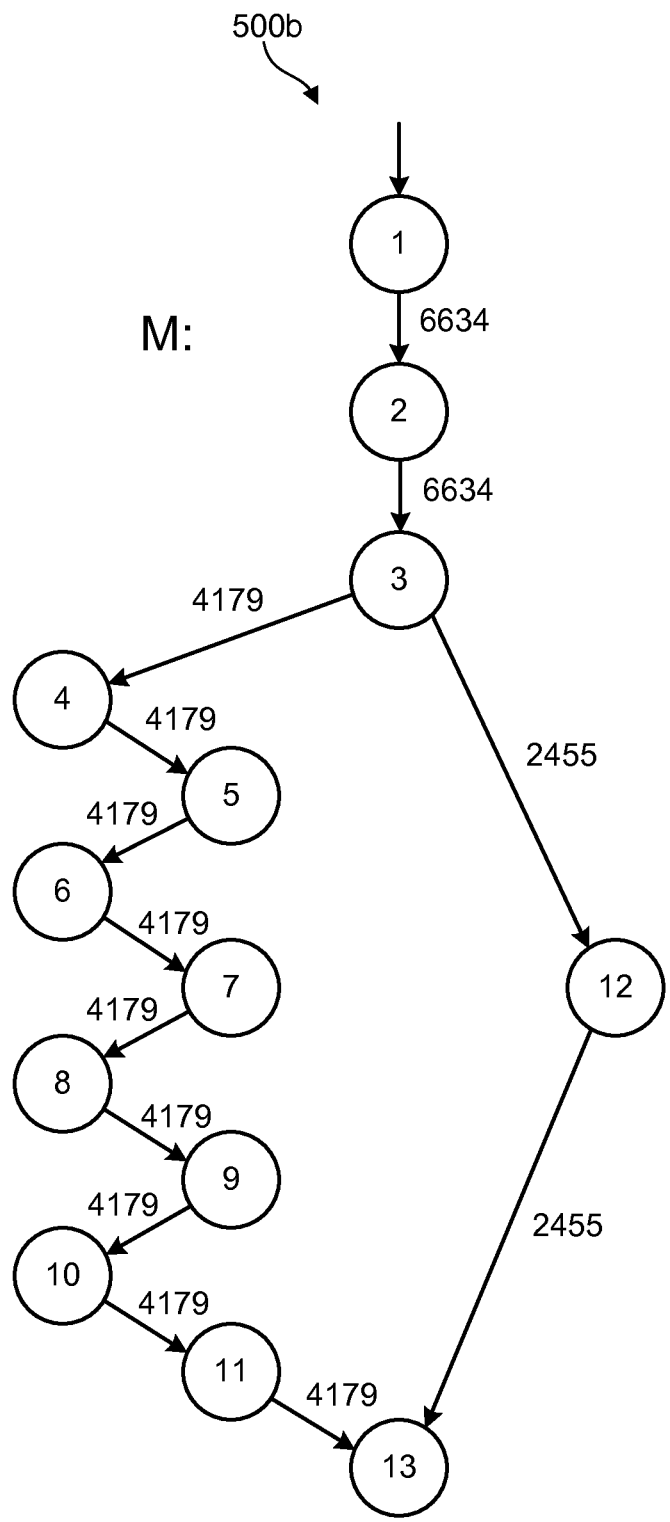
Figure 7:
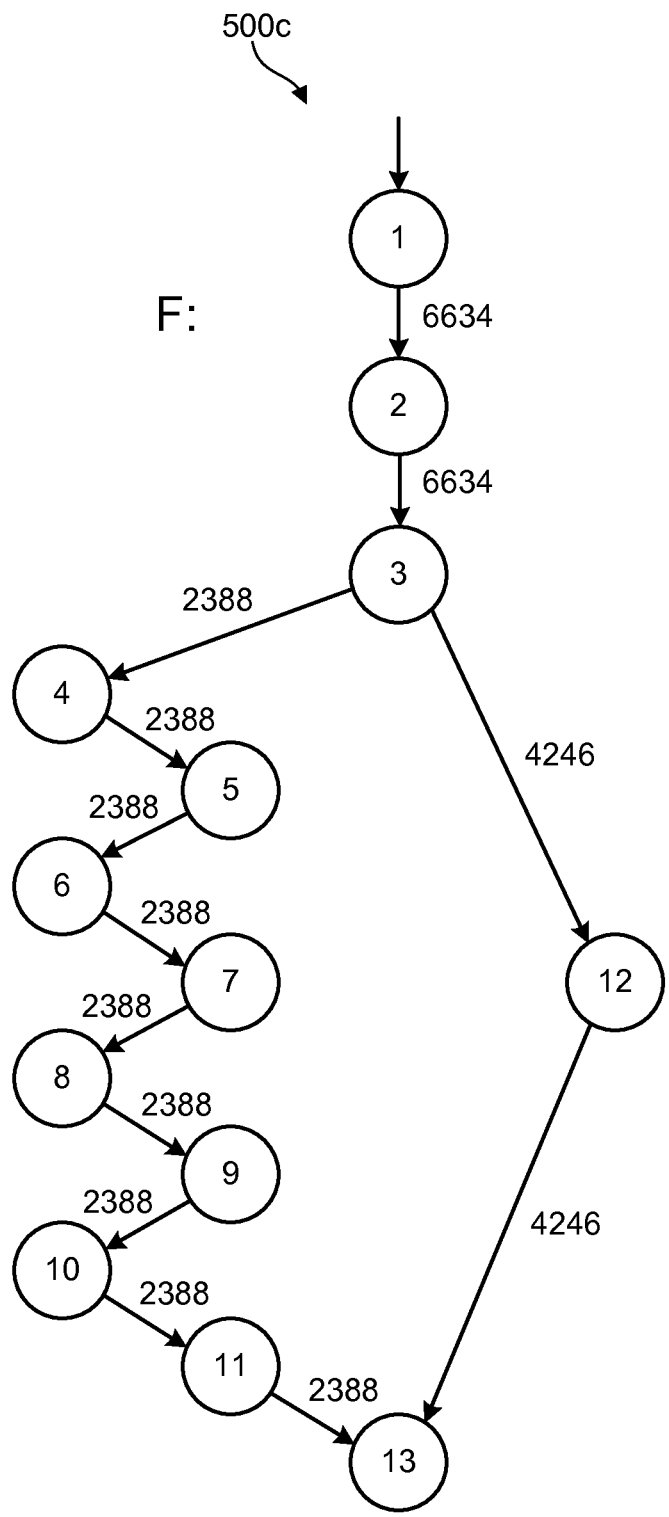
Figure 8:
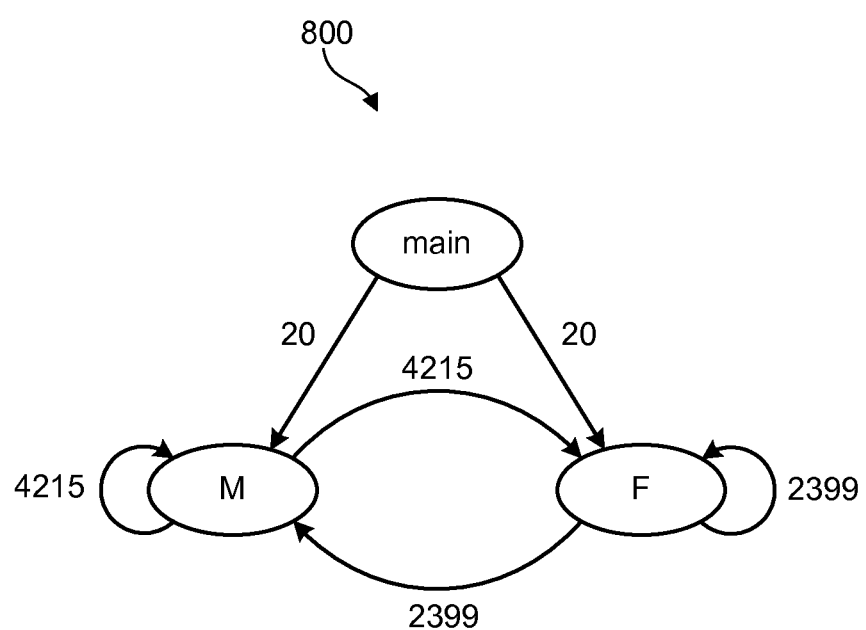
FIG. 8 is a call graph for the computer program shown in FIG. 4.

Using control flow graph and call graph information from the compiler, one or more directed graphs may be constructed showing the execution flow of the program 300. The nodes of these directed graphs may represent individual assembly-level instructions for the program 300. FIGS. 5, 6, and 7 show control flow graphs 500a-c for the three methods (main, M, and F) of the program 300, respectively. The numbers printed on the nodes correspond to the instructions listed in FIG. 4. Similarly, the number adjacent to each edge represents the number of times the edge was traversed during computation of the first 20 male/female numbers FIG. 8 shows the call graph 800 for the computation of the first 20 male/female numbers.

Table 2 contains profiling data from a profiled run of the program 300. In this example, the profiling data includes the following information: (1) the number of observed instruction cache misses; (2) the number of observed data cache misses (3) the number of observed branch mispredictions (recorded for the instruction after the misprediction occurred); and (4) the total number of sampling ticks incurred for the given instruction. It should be noted that because the ticks are sampled, the values for each instruction may differ, and there may be instructions that were executed but did not register any sampling ticks.

TABLE 2

Profiling Data for a Run of the Example Program

| Method | Instruction | I-Cache Misses | D-Cache Misses | Branch Mispredict. | Ticks |
|---|---|---|---|---|---|
| M | 1 | 1025 | | | 5145 |
| M | 2 | | | | 6021 |
| M | 3 | | | | 5843 |
| M | 4 | | | 392 | 3742 |
| M | 5 | | | | 3590 |
| M | 6 | | | | 2994 |

TABLE 2-continued

Profiling Data for a Run of the Example Program

| Method | Instruction | I-Cache Misses | D-Cache Misses | Branch Mispredict. | Ticks |
|---|---|---|---|---|---|
| M | 7 | 2159 | | | 3856 |
| M | 8 | 2430 | 1473 | | 3974 |
| M | 9 | | | | 3299 |
| M | 10 | | | | 3678 |
| M | 11 | | | | 3121 |
| M | 12 | 1231 | | | 1845 |
| M | 13 | 2054 | | | 5096 |
| F | 1 | 530 | | | 5549 |
| F | 2 | | | | 5002 |
| F | 3 | | | | 4986 |
| F | 4 | | | | 2178 |
| F | 5 | | | | 1783 |
| F | 6 | | | | 1599 |
| F | 7 | 1945 | | | 1970 |
| F | 8 | 1721 | 1046 | | 1711 |
| F | 9 | | | | 1792 |
| F | 10 | | | | 1638 |
| F | 11 | | | | 1909 |
| F | 12 | 981 | | 2451 | 4508 |
| F | 13 | 3178 | | | 5822 |
| main | 1 | | | | 1 |
| main | 2 | | | | 0 |
| main | 3 | | | | 0 |
| main | 4 | | | | 0 |
| main | 5 | | | | 12 |
| main | 6 | | | | 10 |
| main | 7 | | | | 9 |
| main | 8 | | | 2 | 14 |
| main | 9 | | | | 19 |
| main | 10 | 15 | 15 | | 4 |
| main | 11 | | | | 8 |
| main | 12 | | | | 17 |
| main | 13 | 11 | 10 | | 19 |
| main | 14 | | | | 13 |
| main | 15 | | | | 15 |
| main | 16 | | | 1 | 1 |

Table 3 lists much of the same data as Table 2, except that the integer-valued profiling data has been thresholded into True/False attributes using a thresholding value of zero. Thus, an I-cache, D-cache, or Branchmiss attribute is assigned to a node if the corresponding instruction has suffered at least one I-cache miss, D-cache miss, or branch misprediction, respectively. In addition, the opcode for a given instruction is also listed as an attribute of the node. In order to represent attributes such as opcode, which can take one of many values, a binary attribute is created for each possible attribute value. These binary attributes may be grouped together in such a way that at most one of them is true for any one instruction.

TABLE 3

Thresholded Profiling Data

| Method | Instruction | Attributes | Ticks |
|---|---|---|---|
| M | 1 | pop, I-Cache | 5145 |
| M | 2 | eq | 6021 |
| M | 3 | cond | 5843 |
| M | 4 | sub, Branchmiss | 3742 |
| M | 5 | push | 3590 |
| M | 6 | call | 2994 |
| M | 7 | call, I-Cache | 3856 |
| M | 8 | pop, I-Cache, D-Cache | 3974 |
| M | 9 | sub | 3299 |
| M | 10 | push | 3678 |
| M | 11 | jump | 3121 |
| M | 12 | push, I-Cache, Branchmiss | 1845 |
| M | 13 | ret, I-Cache | 5096 |
| F | 1 | pop, I-Cache | 5549 |
| F | 2 | eq | 5002 |
| F | 3 | cond | 4986 |
| F | 4 | sub | 2178 |
| F | 5 | push | 1783 |
| F | 6 | call | 1599 |
| F | 7 | call, I-Cache | 1970 |
| F | 8 | pop, I-Cache, D-Cache | 1711 |
| F | 9 | sub | 1792 |
| F | 10 | push | 1638 |
| F | 11 | jump | 1909 |
| F | 12 | push, I-Cache, Branchmiss | 4508 |
| F | 13 | ret, I-Cache | 5822 |
| main | 1 | mv | 1 |
| main | 2 | leq | 0 |
| main | 3 | cond | 0 |
| main | 4 | jump | 0 |
| main | 5 | mvi | 12 |
| main | 6 | geq | 10 |
| main | 7 | cond | 9 |
| main | 8 | push, Branchmiss | 14 |
| main | 9 | call | 19 |
| main | 10 | pop, I-Cache, D-Cache | 4 |
| main | 11 | push | 8 |
| main | 12 | call | 17 |
| main | 13 | pop, I-Cache, D-Cache | 19 |
| main | 14 | incr | 13 |
| main | 15 | jump | 15 |
| main | 16 | exit, Branchmiss | 1 |

Figure 9:
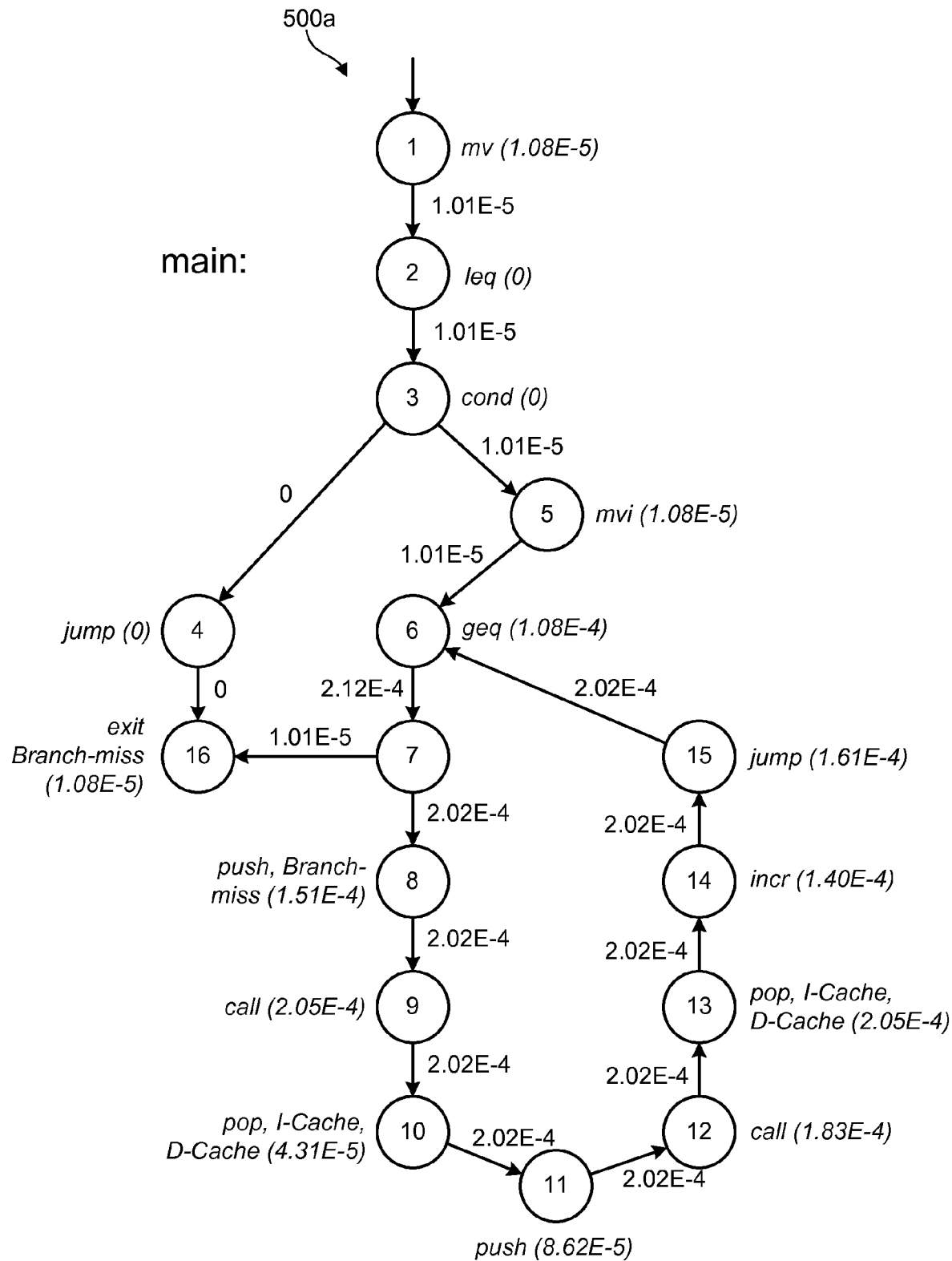
FIGS. 9, 10, and 11 are final weighted, labeled control flow graphs for the three methods (main, M, and F) of FIG. 4.
Figure 10:
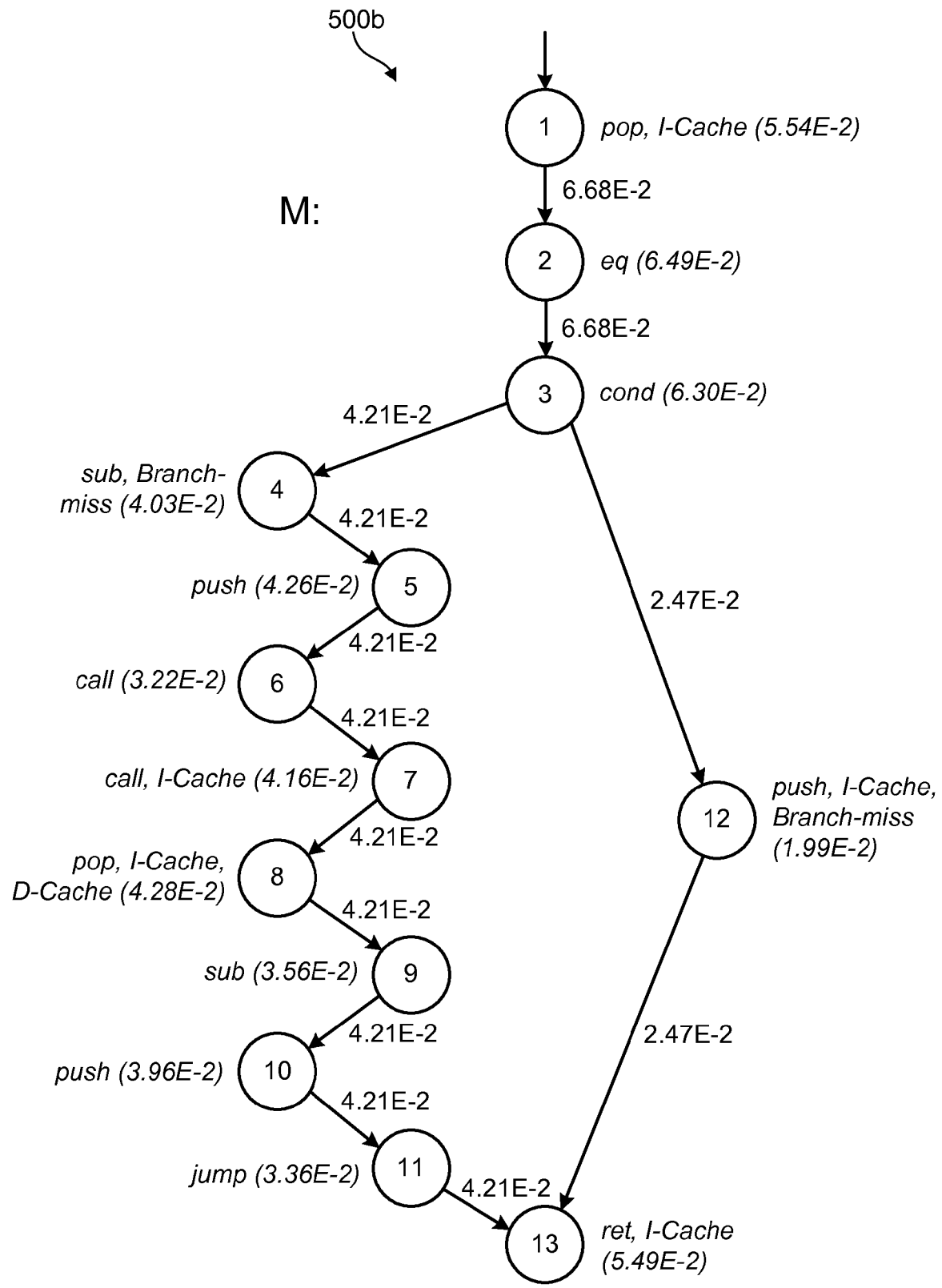
Figure 11:
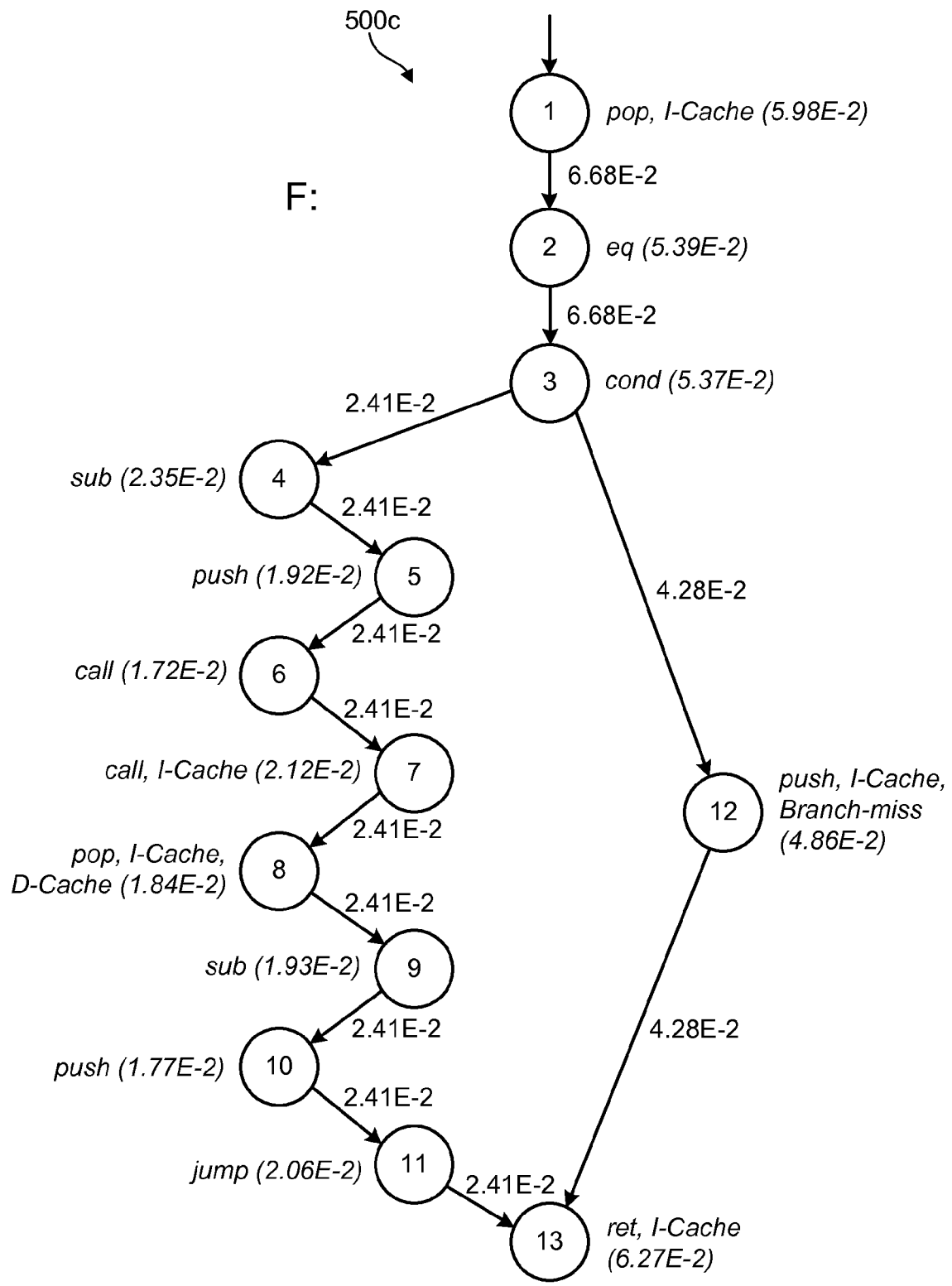

After obtaining the thresholded profiling data in Table 3, the profiling data may be combined with the control flow graphs 500a-c shown in FIGS. 5-7 to yield final weighted, labeled control flow graphs 500a-c, as shown in FIGS. 9-11. In these Figures, each node in the control flow graphs 500a-c represents a single assembly instruction. Node attributes are in italics and the number in brackets is the value of t(i) for each node. The data is now in a format suitable for data mining, and more particularly for finding sequential patterns of attributes in the control flow graphs 500a-c.

As shown in FIGS. 9-11, frequencies associated with edges of the control flow graphs 500a-c and times associated with execution units are estimates of the actual times and frequencies measured during execution of the program 300. In certain embodiments, edge frequencies may be collected by running an interpreter that instruments the program code 300. Similarly, time associated with each instruction may be obtained by hardware counters that perform sampling. These hardware counters may provide "tick" counts for instructions or groups of instructions. In order to prepare the control flow graphs 500a-c for data mining, these tick counts may be converted into normalized execution times associated with each execution unit (e.g., instruction, group of instructions, etc.) in the control flow graphs 500a-c.

In general, the methods 100, 150 disclosed in FIGS. 1A and 1B search for sequential patterns of attributes $A_0, A_1, A_2, \ldots$ that are associated with a sequence of execution units (nodes) $i_0, i_1, i_2, \ldots$ where each $a \in A_k$ is TRUE for execution unit $i_k$ and there are edges $(i_0, i_1), (i_1, i_2), \ldots$ in the directed graph. As previously mentioned in association with FIGS. 1A and 1B, the methods 100, 150 may generate two separate measures of support for a sequence of attributes: "frequency support" and "time support." The frequency support of an attribute set $A_0$, $S_{f,i_0}(A_0)$, associated with an execution unit $i_0$ is equal to the sum of the frequencies of the incoming edges into the node $i_0$ of the directed graph. The frequency support for a sequence of attributes may be computed as follows:

$$S_{f,i_0}(A_0, A_1, \ldots, A_k) = \min\left\{\sum_{(i_m, i_0) \in E} f(i_m, i_0), f(i_0, i_1), \ldots, f(i_{k-1}, i_k)\right\}$$

The time support for an attribute set $A_0$, $S_t(A_0)$, associated with an execution unit $i_0$ is equal to the normalized time associated with $i_0$, $t(i_0)$. The time support for a sequence of attributes may be computed as follows:

$$S_{t,i_0}(A_0, A_1, \ldots, A_k) = \min_{0 \leq j \leq k} t(i_j)$$

Since there may be many execution units i where the sequence of attribute sets $A_0, A_1, \ldots, A_k$ can occur, both time and frequency support can be summed over all such execution units as follows:

$$S_f(A_0, A_1, \ldots, A_k) = \sum_i S_{f,i}(A_0, A_1, \ldots, A_k)$$

$$S_t(A_0, A_1, \ldots, A_k) = \sum_i S_{t,i}(A_0, A_1, \ldots, A_k)$$

Support for a sequence of attributes can then be defined for each of the data mining goals. To discover sequences that either occur frequently or execute for a significant amount of time, support may be defined as follows:

$$S_M(a_0, a_1, \ldots, a_k) = \max\{S_f(a_0, a_1, \ldots a_k), S_t(a_0, a_1, \ldots a_k)\}$$

where the subscript M is used to indicate that the data mining problem is defined in terms of the maximum of the two supports (i.e., the time and frequency support). To discover sequences for which the frequency and time support differ significantly, the difference support may be defined as follows:

$$S_D(A_0, A_1, \ldots, A_k) = |S_f(A_0, A_1, \ldots, A_k) - S_t(A_0, A_1, \ldots, A_k)|$$

In order for the difference support to be above a certain threshold, the frequency support or time support must be above the threshold.

Referring to FIGS. 9-11, consider an example that calculates the support for the sequence Q=<(call), (pop, ICache)>. There are four places in the control flow graphs 500a-c where this sequence occurs: $i_9$ and $i_{12}$ of main; $i_7$ of M; and $i_7$ of F. Using the equations presented above, the support for the sequence Q may be calculated as follows:

$$S_{f,i_9(main)}(Q) = \min\{2.02 \times 10^{-2}, 2.02 \times 10^{-2}\} = 2.02 \times 10^{-2}$$

$$S_{f,i_{12}(main)}(Q) = \min\{2.02 \times 10^{-2}, 2.02 \times 10^{-2}\} = 2.02 \times 10^{-2}$$

$$S_{f,i_7(M)}(Q) = \min\{4.21 \times 10^{-2}, 4.21 \times 10^{-2}\} = 4.21 \times 10^{-2}$$

$$S_{f,i_7(F)}(Q) = \min\{2.41 \times 10^{-2}, 2.41 \times 10^{-2}\} = 2.41 \times 10^{-2}$$

$$S_f(Q) = S_{f,i_9(main)} + S_{f,i_{12}(main)} + S_{f,i_7(M)} + S_{f,i_7(F)} = 0.106$$

$$S_{t,i_9(main)}(Q) = \min\{2.05 \times 10^{-4}, 4.31 \times 10^{-5}\} = 4.31 \times 10^{-5}$$

$$S_{t,i_{12}(main)}(Q) = \min\{1.83 \times 10^{-4}, 2.05 \times 10^{-4}\} = 1.833 \times 10^{-4}$$

$$S_{t,i_7(M)}(Q) = \min\{4.16 \times 10^{-2}, 4.28 \times 10^{-2}\} = 4.21 \times 10^{-2}$$

$$S_{t,i_7(F)}(Q) = \min\{2.12 \times 10^{-2}, 1.84 \times 10^{-2}\} = 1.84 \times 10^{-2}$$

$$S_t(Q) = S_{t,i_9(main)}(Q) + S_{t,i_{12}(main)}(Q) + S_{t,i_7(M)}(Q) + S_{t,i_7(F)}(Q) = 6.02 \times 10^{-2}$$

$$S_M(Q) = \max\{S_f(Q), S_t(Q)\} = \max\{0.106, 0.0602\} = 0.106$$

$$S_D(Q) = |S_f(q) - S_t(Q)| = |0.0196 - 0.0602| = 0.0458$$

Now, consider an example that applies the methods 100, 150 of FIGS. 1A and 1B to the data in FIGS. 9-11 using a minimum (time and frequency) support threshold value of two percent (0.02). From the data in FIGS. 9-11, a first generation $G_1$ of candidate sequences may be constructed as follows:

$G_1 = \{<(mv)>, <(leq)>, <(cond)>, <(exit)>, <(mvi)>, <(geq)>, <(push)>, <(call)>, <(pop)>, <(incr)>, <(ret)>, <(sub)>, <(jump)>, <(ICache)>, <(DCache)>, <(Branchmiss)>\}$ The sequence frequency and time support values may then be calculated as described in FIGS. 1A and 1B. The results are shown in Table 4 below:

TABLE 4

Results of Support Calculations for
First Generation of Candidate Sequences

| Sequence | $S_M$ | $S_D$ |
|---|---|---|
| <(mv)> | $1.08 \times 10^{-5}$ | $7.24 \times 10^{-7}$ |
| <(leq)> | $1.01 \times 10^{-5}$ | $1.01 \times 10^{-5}$ |
| <(cond)> | 0.134 | 0.0170 |
| <(exit)> | $1.08 \times 10^{-5}$ | $7.24 \times 10^{-7}$ |
| <(mvi)> | $1.08 \times 10^{-5}$ | $7.24 \times 10^{-7}$ |
| <(geq)> | $2.12 \times 10^{-4}$ | $1.04 \times 10^{-4}$ |
| <(push)> | 0.200 | 0.0125 |
| <(call)> | 0.133 | 0.0202 |
| <(pop)> | 0.200 | 0.0236 |
| <(ret)> | 0.134 | 0.0161 |
| <(sub)> | 0.132 | 0.0137 |
| <(jump)> | 0.0664 | 0.0120 |
| <(incr)> | $2.02 \times 10^{-4}$ | $6.20 \times 10^{-5}$ |
| <(ICache)> | 0.444 | 0.0184 |
| <(DCache)> | 0.0666 | $5.36 \times 10^{-3}$ |
| <(Branchmiss)> | 0.110 | $8.50 \times 10^{-4}$ |

If $S_M$ is the support value of interest, all items in $G_1$ whose $S_M$ value is less than 0.02 may be discarded. After pruning, this yields:

$G_1 = \{<(cond)>, <(push)>, <(pop)>, <(sub)>, <(call)>, <(ret)>, <(jump)>, <(ICache)>, <(Branchmiss)>, <(DCache)>\}$ If, however, $S_D$ is the support value of interest, all items in $G_1$ whose $S_D$ value is less than 0.02 may be discarded. After pruning, this yields:

$G_1 = \{<(pop)>, <(call)>\}$

The final value of $G_1$, whether pruned according to $S_M$ or $S_D$, is then used to create the next generation $G_2$ as described in association with FIGS. 1A and 1B. This process continues until either $G_{n+1}$ is empty (meaning that no candidate sequence has a time or frequency support value that satisfies the time or frequency support threshold) or until a specified number of generations has been completed.

The flowchart and block diagrams in the Figures illustrate the architecture, functionality, and operation of possible implementations of systems, processes, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. An apparatus comprising a data mining module implemented in at least one of hardware and software operating hardware of the apparatus, the data mining module configured to find sequential patterns of attributes in a directed graph, the data mining module configured to:
    (a) construct a directed graph comprising a plurality of nodes and a plurality of edges between the nodes;
    (b) assign at least one attribute to each of the nodes;
    (c) assign a weight value to each of the edges, wherein each weight value represents a probability that a corresponding edge will be traversed when traversing the directed graph;
    (d) find a first instance of a sequence of attributes, the first instance associated with a first sequence of nodes in the directed graph;
    (e) find a second instance of the sequence of attributes, the second instance associated with a second sequence of nodes in the directed graph, the second sequence of nodes comprising at least one node that is not included in the first sequence of nodes;
    (f) calculate a first instance frequency support value associated with the first instance, and a second instance frequency support value associated with the second instance; and
    (g) calculate a sequence frequency support value by summing the first and second instance frequency support values.

2. The apparatus of claim 1, further comprising finding sequences of attributes in the directed graph that have some minimum amount of frequency support by performing the following:
    (h) creating a first generation $G_1$ of candidate sequences constructed from the union of each individual attribute;
    (i) calculating a sequence frequency support value for each candidate sequence of attributes in the current generation $G_n$;
    (j) discarding all candidate sequences where the sequence frequency support value does not satisfy a frequency support threshold;
    (k) creating a next generation $G_{n+1}$ of candidate sequences from the surviving candidate sequences from step (j); and
    (l) repeating steps (i), j), and (k) until one of the following occurs: a selected number of generations has been completed and no sequence frequency support value satisfies the frequency support threshold.

3. The apparatus of claim 1, wherein calculating the first instance frequency support value comprises multiplying weight values along edges of the first instance, and calculating the second instance frequency support value comprises multiplying weight values along edges of the second instance.

4. The apparatus of claim 1, wherein the directed graph comprises at least one of a branch, a join point, and a cycle.

5. The apparatus of claim 1, where the directed graph is a control flow graph of a computer program.

6. The apparatus of claim 5, wherein each node represents one of an opcode, bytecode, instruction, method, and block of instructions in a computer program.

7. The apparatus of claim 6, wherein each attribute describes the characteristics of one of an opcode, bytecode, instruction, method, and group of instructions.

8. The apparatus of claim 1, wherein the data mining module is further configured to find sequences of attributes in the directed graph that have some minimum amount of time support.

9. The apparatus of claim 8, wherein the data mining module is further configured to calculate the time support by aggregating tick counts for each sequence of attributes in the directed graph.

10. A computer program product for finding sequential patterns of attributes in a directed graph, the computer program product comprising a non-transitory computer-readable storage medium having computer-usable program code embodied therein, the computer-usable program code comprising:
    computer-usable program code to (a) construct a directed graph comprising a plurality of nodes and a plurality of edges between the nodes;
    computer-usable program code to (b) assign at least one attribute to each of the nodes;
    computer-usable program code to (c) assign a weight value to each of the edges, wherein each weight value represents a probability that a corresponding edge will be traversed when traversing the directed graph;
    computer-usable program code to (d) find a first instance of a sequence of attributes, the first instance associated with a first sequence of nodes in the directed graph;
    computer-usable program code to (e) find a second instance of the sequence of attributes, the second instance associated with a second sequence of nodes through the directed graph, the second sequence of nodes comprising at least one node that is not included in the first sequence of nodes;
    computer-usable program code to (f) calculate a first instance frequency support value associated with the first instance, and a second instance frequency support value associated with the second instance; and
    computer-usable program code to (g) calculate a sequence frequency support value by summing the first and second instance frequency support values.

11. The computer program product of claim 10, further comprising computer-usable program code to find sequences of attributes in the directed graph that have some minimum amount of frequency support by performing the following:
    (h) creating a first generation $G_1$ of candidate sequences constructed from the union of each individual attribute;
    (i) calculating a sequence frequency support value for each candidate sequence of attributes in the current generation $G_n$;
    (j) discarding all candidate sequences where the sequence frequency support value does not satisfy a frequency support threshold;
    (k) creating a next generation $G_{n+1}$ of candidate sequences from the surviving candidate sequences from step (j); and
    (l) repeating steps (i), (j), and (k) until one of the following occurs: a selected number of generations has been completed and no sequence frequency support value satisfies the frequency support threshold.

12. The computer program product of claim 10, wherein calculating the first instance frequency support value comprises multiplying weight values along edges of the first instance, and calculating the second instance frequency support value comprises multiplying weight values along edges of the second instance.

* * * * *